United States Patent

Steiner

[11] Patent Number: 5,586,466
[45] Date of Patent: Dec. 24, 1996

[54] NON-SLIP SLEEVE FOR FLOAT LEVEL SENSOR SHAFT

[76] Inventor: George A. Steiner, 4425 Harvard Ave., Montreal, Quebec, Canada, H4A 2W9

[21] Appl. No.: 168,547

[22] Filed: Dec. 16, 1993

[51] Int. Cl.⁶ ................................................ G01F 23/30
[52] U.S. Cl. ................................................ 73/319; 73/311
[58] Field of Search .......................... 116/228; 73/319, 73/320; 137/432

[56] References Cited

U.S. PATENT DOCUMENTS

| 1,859,933 | 5/1932 | Nikonow | 73/311 |
| 1,878,867 | 9/1932 | Leukhardt, Jr. | 116/228 |
| 3,693,649 | 9/1972 | Gordon et al. | 73/322.5 X |
| 3,894,433 | 7/1975 | Riester et al. | 73/313 X |
| 4,312,240 | 1/1982 | Hermanns | 73/861.57 |
| 4,920,798 | 5/1990 | Weaver | 73/313 |

FOREIGN PATENT DOCUMENTS

| 2086576 | 5/1982 | United Kingdom | 73/311 |

Primary Examiner—William A. Cuchlinski, Jr.
Assistant Examiner—Willie Morris Worth
Attorney, Agent, or Firm—Townsend and Townsend Khourie and Crew

[57] ABSTRACT

A non-slip sleeve fits over a shaft for a float level sensor so a float moves up and down on the sleeve surface. This non-slip surface prevents deposits forming thereon when used in tanks with sludge or other solids suspended in liquids. The thin walled sleeve is formed of a polytetrafluoroethylene polymer (PTFE) thus avoiding having to deposit or coat a shaft with PTFE which is expensive and time consuming.

4 Claims, 1 Drawing Sheet

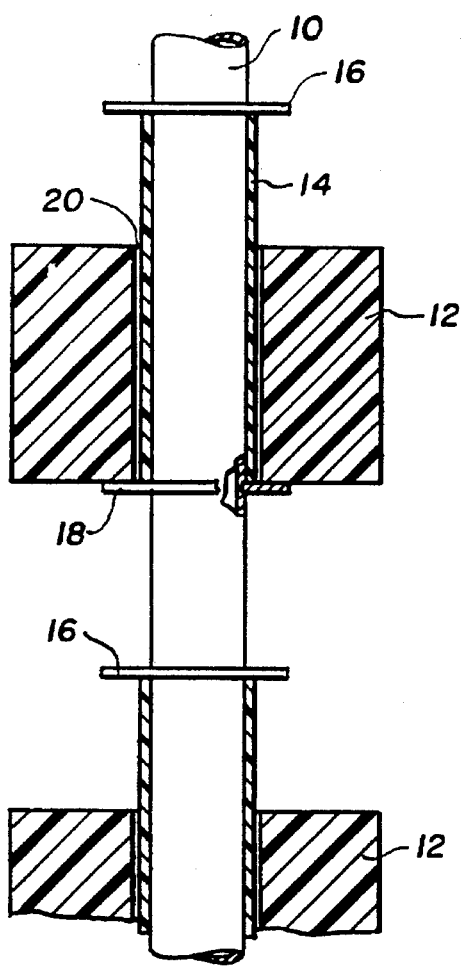
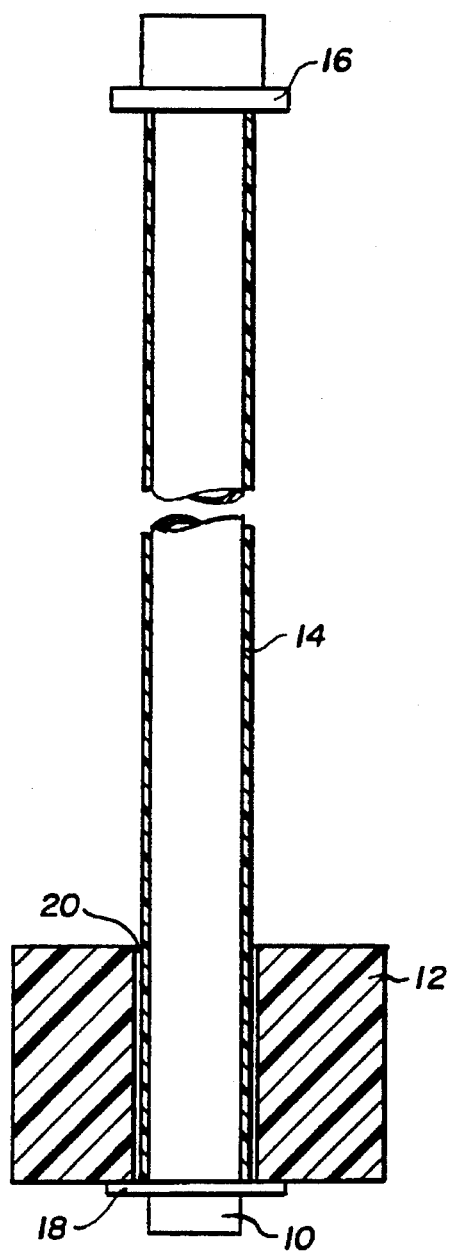

NON-SLIP SLEEVE FOR FLOAT LEVEL SENSOR SHAFT

TECHNICAL FIELD

The present invention relates to float level sensors and more specifically to a non-slip sleeve to fit over a shaft of a float level sensor to prevent sticking of the float on the sleeve.

BACKGROUND ART

Most float level sensors include a shaft which has substantially circular cross-section on which moves a float with a circular hole in the center. In some float level sensors multiple floats move up and down at different positions on a shaft to determine different level ranges and sensors associated with the floats provide signals representing levels in the different ranges. In other instances a single float is provided with a vertical linear movement dependent upon the level range required to be monitored.

In an application where the liquids are dirty and corrosive such as, for example, waste tanks or holding tanks in boats, long range buses, recreational vehicles, airplanes, trains, etc., the surface of the shaft has to be specially coated with a non-slip finish to prevent deposits forming on the shaft thus interfering with the movement of the float on the shaft. In the past one of the ways to achieve a non-slip surface has been by the application of polytetrafluoroethylene polymer, or PTFE for short. An example of this product is sold under the trade mark "TEFLON" and is well known as a material that has very low coefficient of friction, is not attacked by any known solvents, deforms at relatively high temperatures for plastics (above 330° C.) and thus is a good non-stickable material.

The problem with PTFE is its cost, therefore it is not feasible to make a solid shaft or tube out of PTFE, instead the PTFE is deposited on the external surface of a metal shaft, preferably by baking. However, this coating process is time consuming and costly.

DISCLOSURE OF INVENTION

It is an aim of the present invention to provide a non-slip surface on a shaft without having to make the complete shaft out of a non-slip material such as PTFE and without having to coat or deposit PTFE on the external surface of a shaft. This is achieved by providing a thin walled PTFE sleeve that fits over the shaft and which provides a non-slip surface for the float to slide upon. The float has free vertical movement on the thin walled sleeve, which because it is non-slip, does not permit deposits to easily form thereon.

PTFE is commercially available as a thin walled extruded sleeve in a variety of diameters. These sleeves have little physical strength because the walls are so thin. When these sleeves are slipped over a metal or plastic shaft or tube, the metal or plastic provides the strength, while the sleeve provides the non-slip surface. The diameter of the shaft can be made to suit the particular sleeve and a clip or grip is provided to hold the sleeve to the shaft. The cost of a thin walled sleeve made of PTFE is far cheaper than the cost of coating a shaft with PTFE or using a shaft or tube made of PTFE.

The present invention provides in a float level sensor wherein at least one float has a vertical linear movement on a shaft with a circular external cross-section, the movement caused by variation in liquid level, the improvement comprising: a non-stick thin walled sleeve formed of a polytetrafluoroethylene polymer fitting over the shaft, extending for at least the vertical linear movement of the float, the float freely slidable over the sleeve, and gripping means for retaining the sleeve in a desired position on the shaft.

BRIEF DESCRIPTION OF DRAWINGS

In drawings which illustrate embodiments of the present invention,

FIG. 1 is a sectional elevation view showing a multiple float sensor with the floats movable on a non-slip PTFE sleeve according to one embodiment of the present invention, FIG. 2 is a section elevational view showing a single float sensor according to another embodiment of the present invention.

MODES FOR CARRYING OUT THE INVENTION

In FIG. 1, a shaft 10 has two floats 12 shown thereon. Other floats may be provided, but each float 12 has a vertical linear movement representing the length of a non-slip PTFE thin walled sleeve 14 positioned on the shaft 10 between a top clip 16 and a bottom clip 18. The thin walled sleeve 14 fits over the shaft 10, which has a circular external cross-section, a clearance 20 is provided between the central aperture in the float 12 and the exterior surface of the sleeve 14 so the float 12 may move up and down on the sleeve 14.

The clips 16 and 18 may be designed to fit within slots (not shown) cut in the shaft 10. Alternatively, clamps may be provided to grip the clips 16,18 to the shaft 10. As illustrated the clips 16,18 provide a top limit and a bottom limit for movement of the float 12 on the sleeve 14, and the sleeve itself cannot move because it is retained by the clips 16,18. The sleeve 14 is a snug fit over the shaft 10.

FIG. 2 shows an embodiment where there is a single float 12 on a shaft 10. A top clip 16 and a bottom clip 18 retain the non-slip PTFE thin walled sleeve 14 in place. The sleeve 14 shown in FIG. 2 is of longer length than that shown in FIG. 1 and only a single float 12 is provided thus the float can move for the full length of the sleeve 14 between the top clip 16 and the bottom clip 18. This type of float sensor is sometimes referred to as a long float sensor or a single float sensor.

The application of the PTFE sleeve 14 is simple in that it merely has to have a snug fit over the shaft 10 and then retained by clips 16 and 18 as illustrated. When the sensor is used in dirty liquids it is particularly important to have the non-slip PTFE surface because the liquid level in a tank or the like may be unchanged for some time and with no washing or wetting action there may be a build up of deposit occurring at the liquid level. It has been found that even if there is a build up of deposit at the liquid level, when a non-slip surface is provided, any deposits are fairly easily displaced when the level changes and the float 12 does move on the sleeve 14.

Whereas two embodiments of the invention are disclosed herewith and the manner in which the sleeve is retained on the shaft is illustrated by clips, it will be apparent to those skilled in the art that various changes may be made to the embodiments shown without avoiding the scope of the present invention which is limited only by the following claims.

The embodiments of the present invention in which an exclusive property or privilege is claimed are defined as follows:

1. In a float level sensor wherein at least one float has a vertical linear movement on a shaft with a circular external cross-section, the movement caused by variation in liquid level, the improvement comprising:

a non-stick thin walled sleeve formed of a polytetrafluoroethylene polymer fitting over the shaft, extending for at least the vertical linear movement of the float, the float freely slidable over the sleeve, and gripping means for retaining the sleeve in a desired position on the shaft.

2. The float level sensor according to claim 1 wherein there is a single float on the shaft.

3. The float level sensor according to claim 1 wherein there are multiple floats on the shaft and wherein sleeves are provided on the shaft for the vertical linear movement of all the floats.

4. The float level sensor according to claim 1 wherein the gripping means comprises a top clip and a bottom clip at the top and bottom of the non-stick thin walled sleeve to retain the sleeve in position on the shaft, and contain the float on the sleeve.

* * * * *